US012675196B2

(12) United States Patent
Ye

(10) Patent No.: US 12,675,196 B2
(45) Date of Patent: Jul. 7, 2026

(54) TOUCH SENSOR, TOUCH DETECTION METHOD AND DISPLAY DEVICE

(71) Applicant: LG Display Co., Ltd., Seoul (KR)

(72) Inventor: Jae-Hun Ye, Kanagawa (JP)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/955,730

(22) Filed: Nov. 21, 2024

(65) Prior Publication Data

US 2025/0173027 A1 May 29, 2025

(30) Foreign Application Priority Data

Nov. 28, 2023 (JP) .................................. 2023-200835

(51) Int. Cl.
G06F 3/043 (2006.01)
G06F 3/041 (2006.01)
(52) U.S. Cl.
CPC ............ G06F 3/043 (2013.01); G06F 3/0416 (2013.01)
(58) Field of Classification Search
None
See application file for complete search history.

(56) References Cited

U.S. PATENT DOCUMENTS

| | | | |
|---|---|---|---|
| 9,170,668 | B2 | 10/2015 | Schneider et al. |
| 2013/0201134 | A1 | 8/2013 | Schneider et al. |
| 2020/0141793 | A1 | 5/2020 | Kim et al. |
| 2021/0405809 | A1* | 12/2021 | Khajeh ............... G06F 3/04182 |
| 2022/0035474 | A1* | 2/2022 | Suzuki .................. G06F 3/0418 |

FOREIGN PATENT DOCUMENTS

| | | |
|---|---|---|
| JP | 2018-081710 A | 5/2018 |
| KR | 10-2018-0076512 A | 7/2018 |
| KR | 10-2020-0050758 A | 5/2020 |
| KR | 10-2021-0000058 A | 1/2021 |

OTHER PUBLICATIONS

Korean Intellectual Property Office, Office Action, Korean Patent Application No. 10-2024-0162822, Jan. 16, 2026, 22 pages.

* cited by examiner

Primary Examiner — Stephen T. Reed
(74) Attorney, Agent, or Firm — Fenwick & West LLP

(57) ABSTRACT

A touch sensor includes: a plurality of sensor elements which are arranged in a matrix shape across a first direction and a second direction crossing the first direction and are capable of transmitting and receiving ultrasonic waves; and a plurality of lines connected to the plurality of sensor elements, wherein at least one of the plurality of lines is shared by the plurality of sensor elements.

27 Claims, 8 Drawing Sheets

| | | | |
|---|---|---|---|
| 301 | CPU | | |
| 302 | ROM | | |
| 303 | RAM | | |
| 304 | memory device | | |
| 305 | Communication I/F | | |

401 DA converter  402  TL1  51 ... TL5  51

603 AD converter  602 Amplifier circuit  601  RL1  52 ... RL5  52

FIG. 5

TOUCH SENSOR, TOUCH DETECTION METHOD AND DISPLAY DEVICE

CROSS REFERENCE TO RELATED APPLICATION

The present application claims the priority benefit of Japanese Patent Application No. 2023-200835 filed in Japan on Nov. 28, 2023, which is hereby incorporated by reference in its entirety.

BACKGROUND

Field of Technology

The present disclosure relates to a touch sensor, a touch detection method, and a display device.

Discussion of the Related Art

In recent years, display devices that can be operated by touching the display device with a finger, pen, etc. have become widespread. These display devices are equipped with a sensor (i.e., a touch sensor) that detects contact with the display device. Various configurations are applied to the touch sensor, such as an electrostatic capacitance method, a conductive film method, an optical method, and an ultrasonic method. Among these methods, the ultrasonic touch sensor has advantage of being able to detect touch without reducing a transmittance of a panel. Patent Document 1 discloses an ultrasonic touch sensor equipped with a piezoelectric element that generates ultrasonic wave, and a sensor element that detects reflected ultrasonic wave. The touch sensor described in the Patent Document 1 detects contact with an object by detecting ultrasonic wave reflected from the object.

Patent Document 1: Japanese Patent Application Publication No. 2018-81710.

SUMMARY

However, as a number of piezoelectric elements and sensor elements increases, a number of lines also increases, making circuit configuration complex. Furthermore, since high-density mounting of piezoelectric elements and sensor elements is impossible, it may become difficult to improve a resolution of touch detection.

An advantage of the present invention is to provide a touch sensor and a display device which can improve a resolution of touch detection.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a touch sensor includes: a plurality of sensor elements which are arranged in a matrix shape across a first direction and a second direction crossing the first direction and are capable of transmitting and receiving ultrasonic waves; and a plurality of lines connected to the plurality of sensor elements, wherein at least one of the plurality of lines is shared by the plurality of sensor elements.

In another embodiment, a touch sensor includes: M×N sensor elements each of which includes a vibration element that generates an ultrasonic wave and a detection element that detects the ultrasonic wave; M transmission lines which extend in a first direction and each of which is connected to N vibration elements; and N reception lines which extend in a second direction crossing the first direction and each of which is connected to M detection elements.

In another embodiment, a display device includes: a touch panel including the above touch sensor; and a display panel facing the touch panel.

In another embodiment, a touch detection method includes: generating ultrasonic waves from a plurality of sensor elements arranged in a matrix shape across a first direction and a second direction crossing the first direction; and receiving the ultrasonic waves in the plurality of sensor elements, wherein the plurality of sensor elements are connected to a plurality of lines, and wherein at least one of the plurality of lines is shared by the plurality of sensor elements.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings:

FIG. 5 is a timing chart showing an operation of a display device according to a first embodiment of the present disclosure;

DETAILED DESCRIPTION

Figure 1:
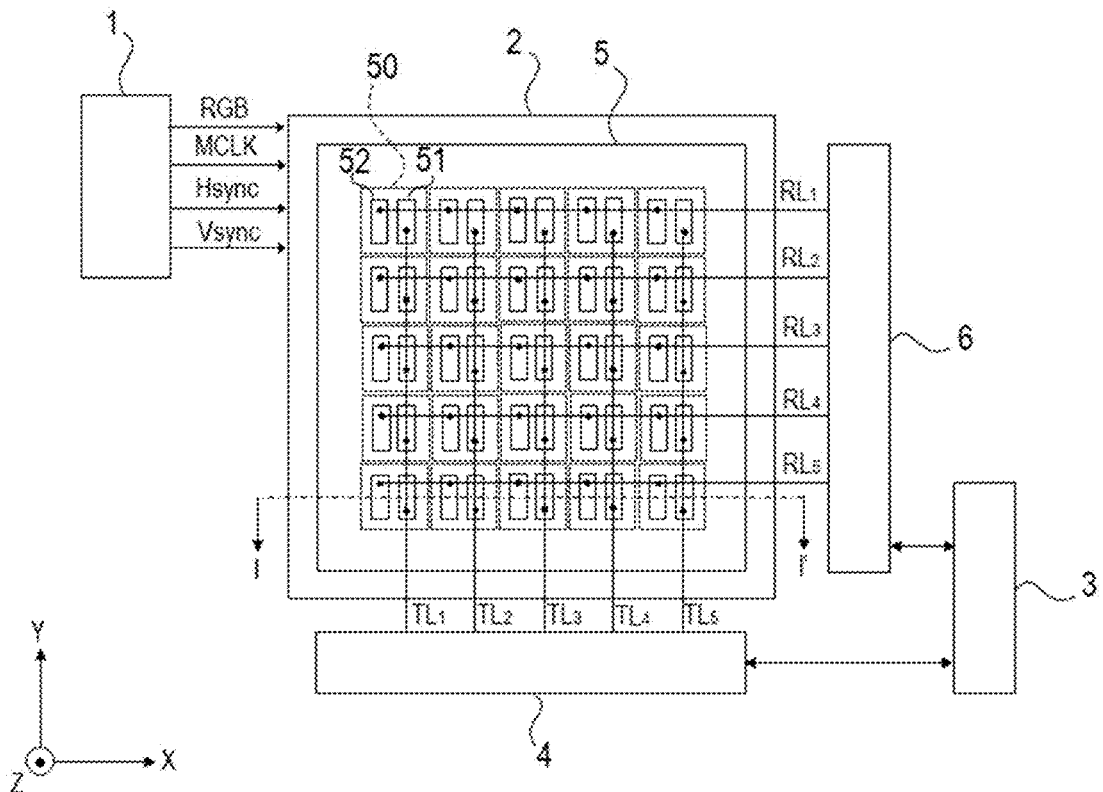
FIG. 1 is a block diagram of a display device according to a first embodiment of the present disclosure.

Hereinafter, embodiments of the present disclosure are described in detail with reference to the drawings. Throughout each of the drawings, elements having common functions are given the same reference numerals, and redundant descriptions are sometimes omitted or simplified.

First Embodiment

FIG. 1 is a block diagram of a display device according to the present disclosure. The display device according to the present embodiment may be a television display, a computer display, a smartphone, a tablet computer, a signage, a flexible display, etc. The display device includes a display controller 1, a display panel 2, and a touch sensor. The touch sensor includes a touch controller 3, a transmission circuit 4, a touch panel 5, and a reception circuit 6. In addition, the touch panel 5 includes a plurality of sensor elements 50, and each sensor element 50 includes a vibration element 51 and a detection element 52.

The display panel 2 may be a liquid crystal display, an organic electro-luminescence (EL) panel, etc. The display panel 2 includes a plurality of pixels arranged in a matrix shape. The display panel 2 displays an image based on an image signal RGB, a main clock signal MCLK, a horizontal synchronization signal Hsync, and a vertical synchronization signal Vsync supplied from the display controller 1.

The display controller 1 is equipped with a clock circuit, a voltage generation circuit, etc. The display controller 1 outputs the image signal RGB, the main clock signal MCLK, the horizontal synchronization signal Hsync, a vertical synchronization signal Vsync, etc. to the display panel 2.

The touch panel 5 is formed facing the display panel 2. The touch panel 5 may be formed on a display surface of the display panel 2 or on a back surface opposite to the display surface of the display panel 2. Here, a horizontal direction of the touch panel 5 is referred to as a X direction (or row direction), a vertical direction of the touch panel 5 is referred to as a Y direction (or column direction), and a perpendicular direction with respect to an operation surface of the touch panel 5 is referred to as a Z direction.

The sensor elements 50 each include the vibration element 51 and the detection element 52, and are arranged in a matrix shape of m rows and n columns in the touch panel 5. As an example, FIG. 1 illustrates 25 sensor elements 50 arranged in a matrix shape of 5 rows and 5 columns.

The vibration element 51 vibrates according to a signal applied thereto and generates ultrasonic wave toward the operation surface of the touch panel 5. A frequency of the ultrasonic wave can be changed by changing a frequency of the signal applied to the vibration element 51.

The detection element 52 is arranged in a position close to the vibration element 51 in the sensor element 50. The ultrasonic wave generated from the vibration element 51 are reflected by the operation surface of the touch panel 5 or an object, and are detected by the detection element 52. The detection element 52 vibrates by detecting the ultrasonic wave and outputs a signal according to the vibration.

The plurality of sensor elements 50 share one reception line among a plurality of reception lines RL1 to RL5. In addition, the plurality of sensor elements 50 share one transmission line among a plurality of transmission lines TL1 to TL5. As a result, the display device of this embodiment can reduce a number of lines connected to the sensor elements 50 compared to a case where lines are individually formed for the plurality of sensor elements 50.

The transmission circuit 4 is connected to the plurality of vibration elements 51 of the touch panel 5 through the plurality of transmission lines TL1 to TL5. The transmission circuit 4 transmits driving signals to the plurality of vibration elements 51 of the touch panel 5 through the plurality of transmission lines TL1 to TL5.

The reception circuit 6 is connected to the plurality of detection elements 52 of the touch panel 5 through the plurality of reception lines RL1 to RL5. The reception circuit 6 outputs detection signals of the plurality of detection elements 52 through the plurality of reception lines RL1 to RL5 to the touch controller 3.

The touch controller 3 supplies the driving signal for driving the sensor element 50 to the transmission circuit 4. In addition, the touch controller 3 receives the detection signal output from the sensor element 50 through the reception circuit 6. The touch controller 3 detects contact between the object and the touch panel 5 based on the detection signals output from the sensor elements 50.

Figure 2:
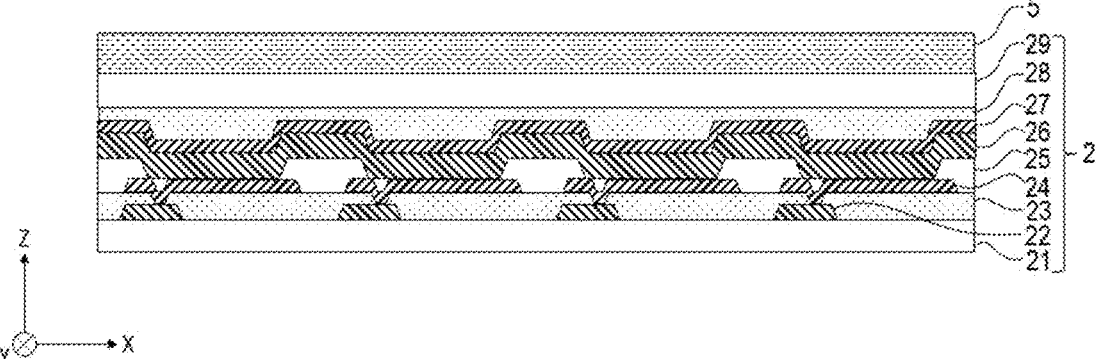
FIG. 2 is a cross-sectional view of a display panel according to a first embodiment of the present disclosure.

FIG. 2 is a cross-sectional view of a display device according to the present embodiment, and is a cross-sectional view of a display panel 2 taken along a line I-I' of FIG. 1. As shown in FIG. 2, the display device includes the display panel 2 and the touch panel 5 formed on the display panel 2. The display panel 2 includes a substrate 21, a transistor 22, a buffer layer 23, an anode electrode 24, a bank layer 25, an organic light emitting layer 26, a cathode electrode 27, an insulating layer 28, and an encapsulating layer 29. The substrate 21 is formed of a rigid material such as glass. In addition, the substrate 21 may be a flexible substrate that is stretchable. When the substrate 21 is a flexible substrate, the substrate 21 is formed of a plastic such as polyimide or polyester.

The buffer layer 23 is formed on the substrate 21. The buffer layer 23 may be formed of an inorganic insulating material such as silicon oxide (SiOx) or silicon nitride (SiNx). The buffer layer 23 has a function of protecting the transistor 22 from impurities such as moisture or oxygen that have entered from an outside. The buffer layer 23 has a contact hole for connecting the transistor 22 and the anode electrode 24.

The transistor 22 is embedded in the buffer layer 23. The transistor 22 is formed on the substrate 21. The transistor 22 is a thin film transistor (TFT). The transistor 22 is formed of a material such as polysilicon, amorphous silicon or the like. The transistor 22 constitutes a circuit of the pixel included in the display panel 2.

The bank layer 25 is formed on the buffer layer 23. The bank layer 25 may be formed of an inorganic insulating material such as silicon oxide (SiOx) or silicon nitride (SiNx). The bank layer 25 has a contact hole (or opening) for connecting the anode electrode 24 and the organic light emitting layer 26. The anode electrode 24 is embedded in the bank layer 25. The anode electrode 24 is formed on the buffer layer 23. In a case where the display device is a top emission type that emits light upward from the substrate (i.e., in the Z direction), the anode electrode 24 may be formed of an opaque electrode such as silver (Ag), gold (Au), or aluminum (Al). In a case where the display device is a bottom emission type that emits light toward the substrate (i.e., in the −Z direction), the anode electrode 24 may be formed of a transparent electrode such as indium tin oxide (ITO) or fluorine tin oxide (or fluorine-doped tin oxide) (FTO). The anode electrode 24 is connected to the transistor 22 through the contact hole of the buffer layer 23.

The organic light emitting layer 26 is formed on the bank layer 25. The organic light emitting layer 26 may be an organic light emitting diode (OLED). The organic light emitting layer 26 is connected to the anode electrode 24 through the contact hole of the bank layer 25.

The cathode electrode 27 is formed on the organic light emitting layer 26. When the display device is a bottom emission type that emits light toward the substrate (i.e., in the −Z direction), the cathode electrode 27 may be formed of an opaque electrode such as silver (Ag), gold (Au), or aluminum (Al). When the display device is a top emission type that emits light upward from the substrate (i.e., in the Z direction), the cathode electrode 27 may be formed of a transparent electrode such as indium tin oxide (ITO) or fluorine tin oxide (FTO).

The insulating layer 28 is formed on the cathode electrode 27. The insulating layer 28 may be formed of an inorganic insulating material such as silicon oxide (SiOx) or silicon nitride (SiNx), or may be formed of an organic insulating organic material. The insulating layer 28 has a function of insulating the cathode electrode 27 from an outside.

The encapsulating layer 29 is formed on the insulating layer 28. The encapsulating layer 29 may be formed of an inorganic insulating material such as silicon oxide (SiOx) or silicon nitride (SiNx), or may be formed of an organic insulating material. The encapsulating layer 29 has a function of blocking impurities such as moisture or oxygen that have entered from an outside.

Figures 3, 4:
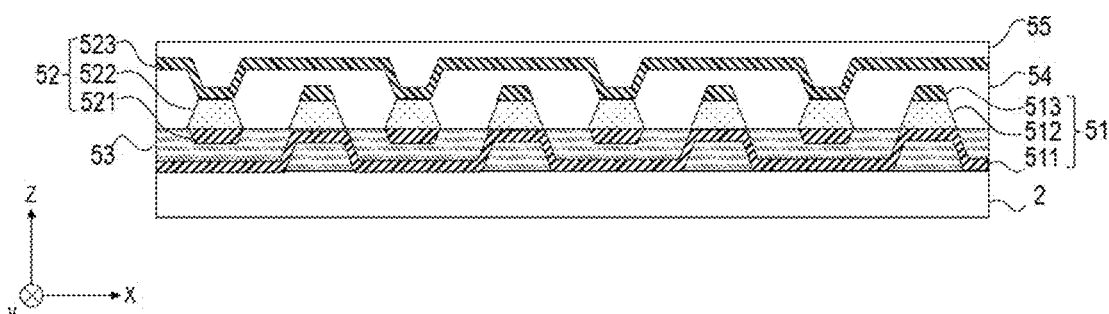
FIG. 3 is a cross-sectional view of a touch panel according to a first embodiment of the present disclosure.
FIG. 4 is a block diagram of a display device according to a first embodiment of the present disclosure.

FIG. 3 is a cross-sectional view of a display device according to one embodiment, and is a cross-sectional view of a touch panel 5 along a line I-I' of FIG. 1. As shown in FIG. 3, the touch panel 5 is formed on the display panel 2. The touch panel 5 has the vibration element 51, the detection element 52, an insulating layer 53, an insulating layer 54, and an insulating layer 55. In addition, the vibration element 51 has an electrode 511, a dielectric 512, and an electrode 513, and the detection element 52 has an electrode 521, a dielectric 522, and an electrode 523.

The insulating layer 53 is formed on the display panel 2. The insulating layer 53 may be formed of an inorganic insulating material such as silicon oxide (SiOx) or silicon nitride (SiNx), or may be formed of an organic insulating material. The insulating layer 53 has a contact hole for connecting the electrode 511 and the dielectric 512. The electrode 511 is embedded in a lower surface of the insulating layer 53. The electrode 511 extends in the X direction and is shared with the electrode 511 of another vibration element 51 in the X direction. The electrode 511 is formed at an upper surface of the insulating layer 53 through the contact hole of the insulating layer 53. The electrode 511 may be formed of a transparent electrode such as indium tin oxide or fluorine-doped tin oxide. The electrode 521 is embedded in an upper surface of the insulating layer 53. The electrode 521 is formed between the electrode 511 portions formed at the upper surface of the insulating layer 53. The electrode 521 may be formed of the same material as the electrode 511.

The insulating layer 54 is formed on the insulating layer 53. The insulating layer 54 may be formed of the same material as the insulating layer 53. The insulating layer 54 has a contact hole for connecting the dielectric 522 and the electrode 523.

The dielectric 512 is embedded in a lower surface of the insulating layer 54. A lower surface of the dielectric 512 is connected to the electrode 511 formed at the upper surface of the insulating layer 53. The dielectric 512 may be formed of a material such as a dielectric elastomer, ceramic, barium titanate, lead zirconate titanate, or zinc oxide. The electrode 513 is embedded in the insulating layer 54. The electrode 513 is connected to an upper surface of the dielectric 512. The electrode 513 may be formed of the same material as the electrode 511. The dielectric 522 is embedded in the lower surface of the insulating layer 54. A lower surface of the dielectric 522 is connected to the electrode 521 formed at the upper surface of the insulating layer 53. The dielectric 522 may be formed of the same material as the dielectric 512.

The insulating layer 55 is formed on the insulating layer 54. The insulating layer 55 may be formed of the same material as the insulating layer 53. The electrode 523 is embedded in a lower surface of the insulating layer 55. The electrode 523 extends in the X direction and is shared with the electrode 523 of another detection element 52 in the X direction. The electrode 523 is connected to an upper surface of the dielectric 522 through the contact hole of the insulating layer 54. The electrode 523 may be formed of the same material as the electrode 511.

The electrode 513 is connected to the transmission circuit 4 through one of the plurality of transmission lines TL1 to TL5 together with the electrodes 513 of other vibration elements 51 arranged in the Y direction. The electrode 511 is connected to the transmission circuit 4 through a line. The electrode 511 and the electrode 513 receive a driving signal from the transmission circuit 4.

When the driving signal is transmitted to the electrodes 511 and 513, an electrostatic force is generated between the electrodes 511 and 513. The electrodes 511 and 513 are attracted to each other by the electrostatic force, causing the dielectric 512 to contract in the Z direction. In this way, the vibration element 51 contracts in the Z direction. When the driving signal is not applied to the electrodes 511 and 513, the electrostatic force generated between the electrodes 511 and 513 disappears. The electrodes 511 and 513 that were attracted to each other by the electrostatic force move away from each other, causing the dielectric 512 to extend in the Z direction. As a result, the vibration element 51 extends in the Z direction. That is, the vibration element 51 contracts and extends according to the driving signal transmitted to the electrodes 511 and 513, and the vibration element 51 can emit ultrasonic wave to the touch panel 5.

When the ultrasonic wave are applied to the dielectric 522, a detection signal can be generated between the electrodes 521 and 523 due to vibration of the dielectric 522. Therefore, it becomes possible to detect the ultrasonic wave generated by the vibration element 51 based on the detection signal output from the detection element 52.

The electrode 523 is connected to the reception circuit 6 through one of the plurality of reception lines RL1 to RL5 together with the electrodes 523 of other detection elements 52 arranged in the X direction. The electrode 521 is connected to the receiving circuit 6 through a line.

FIG. 4 is a block diagram of a display device according to one embodiment, showing the touch controller 3, the transmission circuit 4, the touch panel 5, and the reception circuit 6. The touch controller 3 is equipped with a CPU (Central Processing Unit) 301, a ROM (Read Only Memory) 302, a RAM (Random Access Memory) 303, a memory device 304, a communication I/F 305, and a bus 306. Parts of the touch controller 3 is connected to each other through the bus 306.

The CPU 301 is a processor that performs a predetermined operation according to a program stored in the ROM 303, the memory device (304), etc., and also has a function of controlling each part of the touch controller 3. The CPU 301 loads the program stored in the ROM 303, the memory device (304), etc. into the RAM 302 and executes it. The RAM 302 is configured as a volatile memory medium and provides a temporary memory area necessary for the operation of the CPU 301. The ROM 303 is configured as a nonvolatile memory medium and stores necessary information such as an operation program of the CPU 301. The memory device 304 is configured as a nonvolatile memory medium such as a flash memory, a hard disk, etc. The communication I/F 305 is a communication interface for wireless communication or wired communication, and is a module for performing communication with other devices.

The transmission circuit 4 is equipped with a DA converter 401 and a multiplexer 402. The DA converter 401 converts a digital signal output from the CPU 301 into a driving signal of a predetermined frequency. The driving signal is output to the multiplexer 402. The multiplexer 402 is equipped with an input node and a plurality of output nodes. In addition, the multiplexer 402 is equipped with a control node. The driving signal is input from the DA converter 401 to the input node. A control signal from the CPU 301 is input to the control node. The multiplexer 402 can select the output node based on the control signal of the CPU 301. The transmission lines TL1 to TL5 are connected to the output nodes. The driving signal of a predetermined frequency is sequentially output to the vibration elements 51 through the transmission lines TL1 to TL5.

The reception circuit 6 is provided with a multiplexer 601, an amplifier circuit 602, and an AD converter 603. The multiplexer 601 is provided with a plurality of input nodes and an output node. In addition, the multiplexer 601 is provided with a control node. The reception lines RL1 to RL5 are connected to the input nodes. The detection signals are input from the detection elements 52 to the input nodes through the reception lines RL1 to RL5. A control signal from the CPU 301 is input to the control node, and the detection signals of the reception lines RL1 to RL5 are sequentially output to the output node according to the control signal. The amplifier circuit 602 includes a differential amplifier circuit and amplifies a voltage of a weak detection signal output from the detection element 52. The AD converter 603 includes a comparison circuit and a reference voltage generation circuit, and converts the detection signal into a digital signal. The AD converter 603 outputs the digital signal to the CPU 301 through the bus 306.

Figure 5:
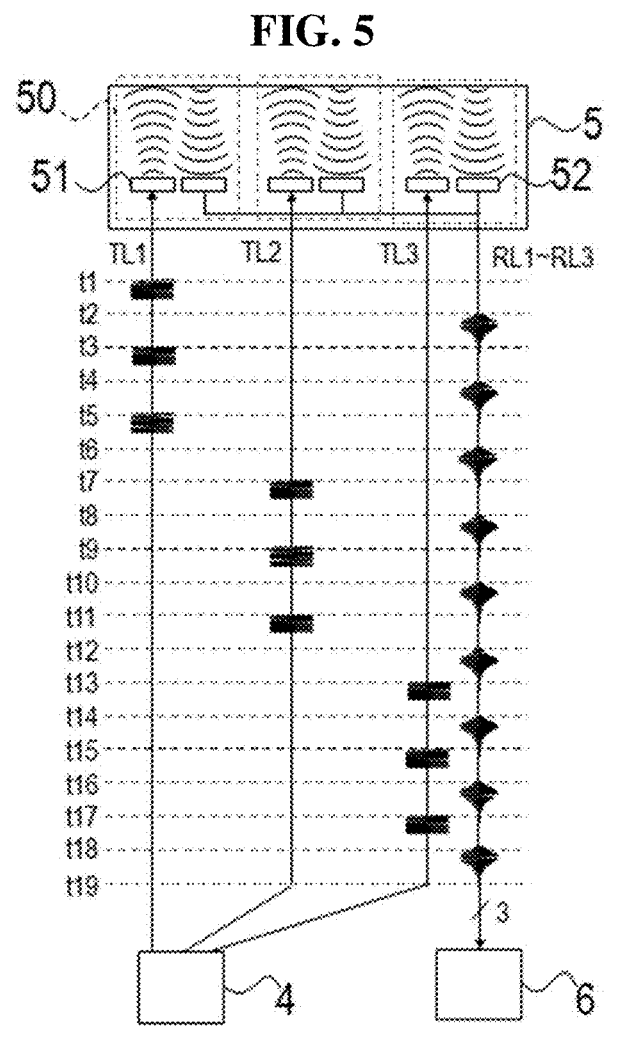

FIG. 5 is a timing chart showing an operation of a display device according to one embodiment. For the sake of simplicity, it is assumed that the touch panel 5 has three transmission lines TL1 to TL3, three reception lines RL1 to RL3, and nine (i.e., 3*3) sensor elements 50. At a time t1, the transmission circuit 4 switches the multiplexer 402 and selects the transmission line TL1 as the output node. At a time t1 to t2, the transmission circuit 4 outputs a driving signal to three vibration elements 51 through the transmission line TL1. The three vibration elements 51 vibrate according to the drive signal and generate ultrasonic waves toward the operating surface of the touch panel 5. Each ultrasonic wave generated by the three vibration elements 51 is reflected by the operating surface of the touch panel 5 or an object, and reaches each of the nine detection elements 52. The ultrasonic wave path from the vibration element 51 to the detection element 52 is different for each of the nine detection elements 52. Therefore, the detection signals output from the nine detection elements 52 may also be different.

At a time t2 to t3, the reception circuit 6 switches the multiplexer 601 and selects the reception line RL1 as an input node. Here, since three detection elements 52 are connected to the reception line RL1, three detection signals are superimposed and output to the reception line RL1. The reception circuit 6 receives the detection signal in the receiving line RL1, and the touch controller 3 stores the detection signal after AD conversion in the memory device 304.

At a time t3 to t4, the transmission circuit 4 outputs a driving signal to the three vibration elements 51 through the transmission line TL1. At a time t4 to t5, the reception circuit 6 selects the reception line RL2 and receives a detection signal in the reception line RL2. The touch controller 3 stores the detection signal after AD conversion in the memory device 304.

At a time t5 to t6, the transmission circuit 4 further outputs a driving signal to the three vibration elements 51 through the transmission line TL1. At a time t6 to t7, the reception circuit 6 selects the reception line RL3 and receives a detection signal in the reception line RL3. After AD conversion, the detection signal is stored in the memory device 304.

At a time t7, the transmission circuit 4 switches the output node of the multiplexer 402 from the transmission line TL1 to the transmission line TL2. The transmission circuit 4 outputs a driving signal to the vibration elements 51 through the transmission line TL2 three times (i.e., at times t7 to t8, t9 to t10, and t11 to t12). The reception circuit 6 sequentially selects the reception lines RL1 to RL3 by the multiplexer 601 and receives a detection signal in each of the receiving lines RL1 to RL3 (i.e., at each of times t8 to t9, t10 to t11, and t12 to t13). The touch controller 3 AD-converts the received detection signals and stores them in the memory device 304.

Similarly, at a time t13, the transmission circuit 4 switches the output node of the multiplexer 402 from the transmission line TL2 to the transmission line TL3. The transmission circuit 4 outputs a driving signal to the vibration elements 51 through the transmission line TL3 three times (i.e., at times t13 to t14, t15 to t16, and t17 to t18). The reception circuit 6 sequentially selects the reception lines RL1 to RL3 by the multiplexer 601 and receives a detection signal in each of the reception lines RL1 to RL3 (i.e., at each of times t14 to t15, t16 to t17, and t18 to t19). The received detection signals are AD converted and then stored in the memory device 304.

As described above, the touch controller 3 can acquire 3*3=9 detection signals corresponding to the combination of the transmission lines TL1 to TL3 and the reception lines RL1 to RL3.

Hereinafter, a method for specifying a contact position between the object and the touch panel 5 is described with reference to FIG. 5. A waveform change of the detection signal increases as an ultrasonic wave transmission distance from the vibration element 51 that generates the ultrasonic wave to the detection element 52 that detects the ultrasonic wave becomes shorter. For example, it is assumed that the object has come into contact at a position corresponding to the sensor element 50 connected to the reception line RL1 and the transmission line TL2. In a case where the vibration element 51 in the sensor element 50 connected to the transmission line TL2 generates the ultrasonic wave and the detection element 52 connected to the reception line RL1 detects the ultrasonic wave, the transmission distance of the ultrasonic wave becomes the shortest. Therefore, among the nine detection signals corresponding to the combination of the transmission lines TL1 to TL3 and the reception lines RL1 to RL3, the detection signal corresponding to the reception line RL1 and the transmission line TL2 has the maximum change in the waveform of the detection signal. The touch controller 3 can specify the contact position of the object by determining the detection signal at which the waveform change is maximum.

In addition, a method for determining the contact position of the object is not limited to the method for determining the detection signal at which the waveform change is maximum. For example, the touch controller 3 can specify the contact position of the object by determining the detection signal at which the waveform change is greater than a predetermined threshold value. As a result, even when the object comes into contact with the touch panel 5 at multiple positions, the touch controller 3 can specify the contact positions.

The waveform change of the detection signal described above can be determined by various methods. Hereinafter, methods for determining the waveform change of the detection signal are described with reference to FIG. 6.

FIG. 6A to FIG. 6D illustrate detection signals in a display device according to one embodiment. In FIGS. 6A to 6D, a signal component A represents a reflected wave from the touch panel 5, and a signal component B represents a reflected wave from the object. In addition, in FIG. 6A, a waveform of an ultrasonic frequency and a waveform of an envelope are shown together, but in FIGS. 6B to 6D, a waveform of an ultrasonic frequency is omitted and a waveform of an envelope is shown as a detection signal.

Figure 6A:
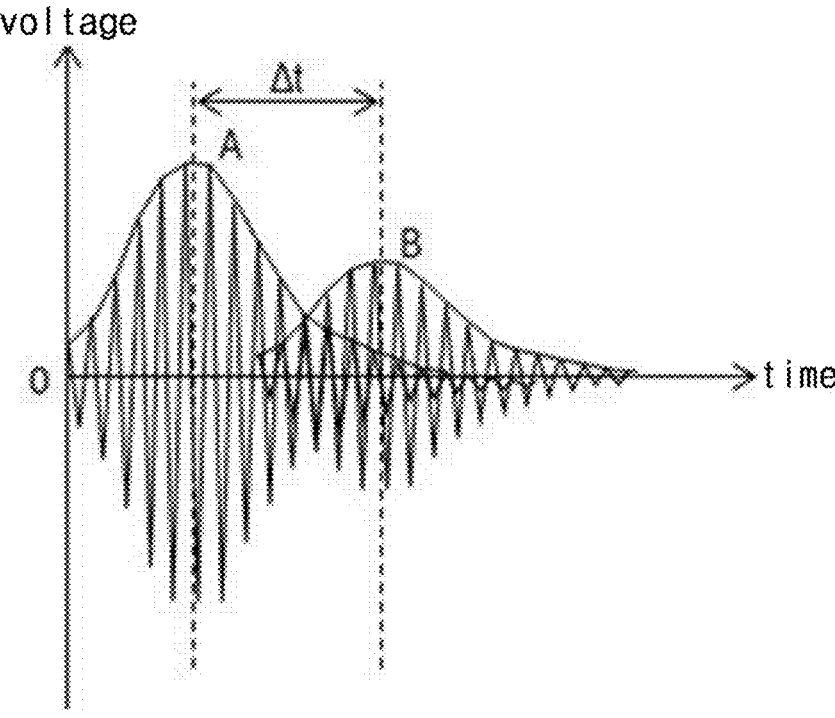
FIG. 6A to FIG. 6D illustrate detection methods in a display device according to a first embodiment of the present disclosure.

FIG. 6A shows a judgment method based on a time difference of a detection signal. The ultrasonic wave generated from the vibration element 51 is emitted in various directions and is repeatedly reflected within the touch panel 5. Therefore, the detection signal may include multiple signal components based on a first-order reflected wave as well as a higher-order reflected wave. Here, when the object comes into contact with the touch panel 5, the ultrasonic wave from the vibration element 51 is reflected not only by the touch panel 5 but also by the object. Therefore, the detection signal includes the signal component B of the reflected wave from the object. Here, a change in the detection signal can be detected by judging whether or not a time difference $\Delta t$ between the signal component A and the signal component B is within a known range. That is, if the time difference $\Delta t$ is within a known range, the touch controller 3 can determine contact with the object.

Figure 6B:
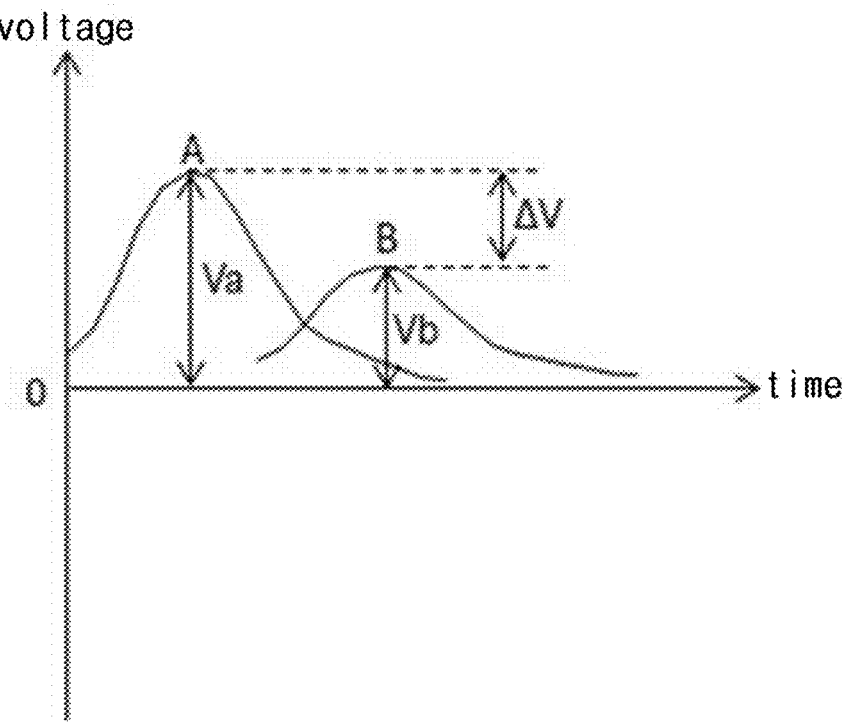

FIG. 6B illustrates a judgment method based on a voltage difference of a detection signal. When the touch panel 5 is touched, the detection signal may include the signal component A and further the signal component B based on the reflected wave from the object. The touch controller 3 can judge the contact of the object by judging whether a voltage difference $\Delta V$ between a peak voltage Va of the signal component A and a peak voltage Vb of the signal component B is within a known range or not.

Figures 6C, 6D:
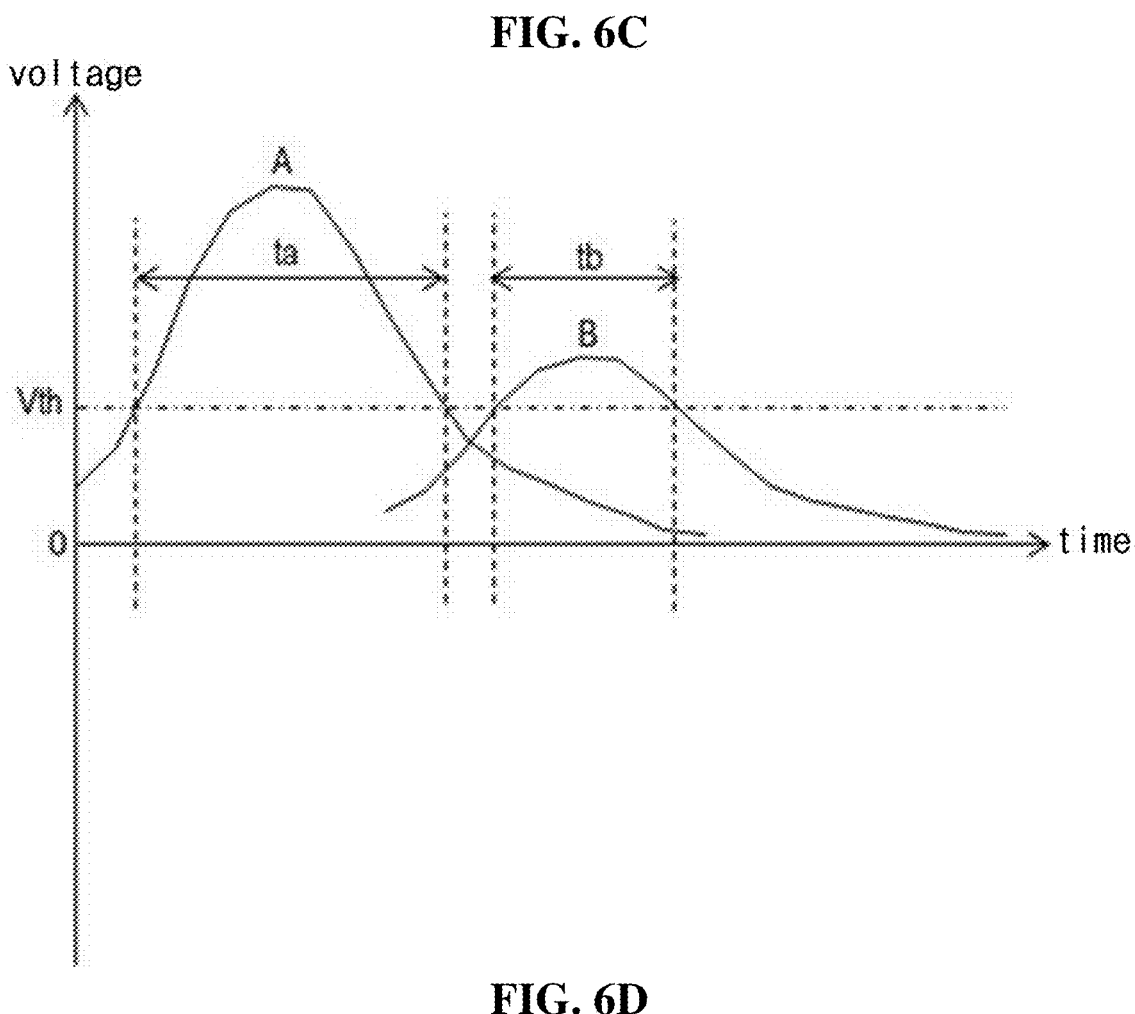

FIG. 6C illustrates a judgment method based on a time span of a detection signal. The time span of the detection signal can be detected as, for example, a time of the detection signal exceeding a predetermined threshold voltage Vth. The change in the detection signal can be detected by judging whether a difference between a time span ta of the signal component A and a time span tb of the signal component B is within a known range or not.

FIG. 6D illustrates a judgment method based on a frequency spectrum of a detection signal. In FIG. 6D, the horizontal axis represents frequency and the vertical axis represents sound pressure. The frequency spectrum can be calculated by, for example, Fourier transforming the detection signal. The frequency of the ultrasonic wave generated from the vibration element 51 changes by passing through dielectric, etc. in the touch panel 5. Therefore, the frequency of the detection signal changes based on transmission distance, transmission medium, etc. As shown in FIG. 6D, spectrum A shows the reflected wave from the touch panel 5, and spectrum B shows the reflected wave from the object. The touch controller 3 can detect the contact between the object and the touch panel 5 based on peak frequencies fa and fb of the spectrums of the detection signal.

The touch controller 3 can detect the contact between the object and the touch panel 5 based on the waveform change of the detection signal after the AD conversion using the judgment methods described above.

According to this embodiment, the plurality of sensor elements 50 share one reception line among the plurality of reception lines. In addition, the plurality of sensor elements 50 share one transmission line among the plurality of transmission lines. This makes it possible to reduce a number of lines connected to the sensor elements 50 and simplify circuit configuration compared to the case where lines are individually formed for the plurality sensor elements 50. Furthermore, since the sensor elements 50 can be mounted at a high density, it becomes possible to improve a solution of touch detection.

Second Embodiment

A display device according to a second embodiment is described. The display device according to the second embodiment differs from the first embodiment in that it uses ultrasonic waves of different frequencies. Hereinafter, description focuses on configuration different from the first embodiment.

Figures 7, 8:
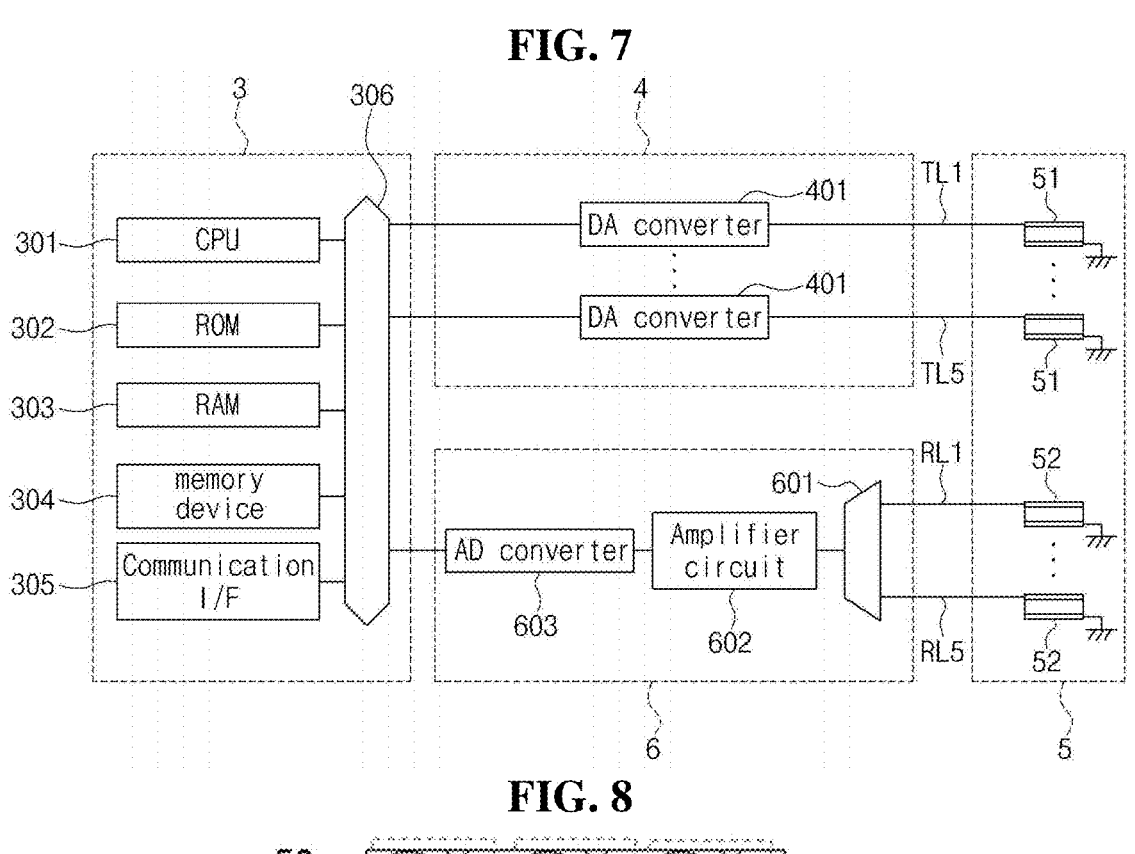
FIG. 7 is a block diagram of a display device according to a second embodiment of the present disclosure.
FIG. 8 is a timing chart showing an operation of a display device according to a second embodiment of the present disclosure.

FIG. 7 is a block diagram of a display device according to this embodiment, showing a touch controller 3, a transmission circuit 4, a touch panel 5, and a reception circuit 6. The transmission circuit 4 is equipped with a plurality of DA converters 401. Each of the plurality of DA converters 401 is formed for each vibration element 51. The CPU 301 outputs different digital signals to the plurality of DA converter 401, respectively, and the plurality of DA converters 401 can respectively generate driving signals of different frequencies. With this configuration, it is possible to simultaneously output a plurality of driving signals having different frequencies to the transmission lines TL1 to TL5. The reception circuit 6 sequentially selects the receiving lines RL1 to RL5 through the multiplexer 601 and receives the detection signals, similar to the first embodiment.

FIG. 8 is a timing chart showing an operation of a display device according to this embodiment. As in FIG. 5, it is assumed that the touch panel 5 has three transmission lines TL1 to TL3, three reception lines RL1 to RL3, and nine (3*3) sensor elements 50.

At a time t1 to t2, the reception circuit 6 switches the multiplexer 601 and selects the reception line RL1 as an input node. The transmission circuit 4 simultaneously outputs driving signals to the plurality of transmission lines TL1 to TL3. That is, the transmission circuit 4 outputs a driving signal of frequency f1 to the transmission line TL1, a driving signal of frequency f2 to the transmission line TL2, and a driving signal of frequency f3 to the transmission line TL3. As a result, ultrasonic waves of different frequencies f1, f2, and f3 are generated simultaneously.

At a time t2 to t3, the reception circuit 6 selects the reception line RL1 and receives detection signals of three detection elements 52 through the reception line RL1. The detection signals of the receiving line RL1 includes signal components of frequencies f1, f2, and f3. In this way, the reception circuit 6 can receive a detection signal including the signal components of three frequencies f1, f2, and f3.

At a time t3 to t5, the transmission circuit 4 simultaneously outputs driving signals to the plurality of transmission lines TL1 to TL3. The reception circuit 6 selects the reception line RL2 and receives a detection signal in the receiving line RL2.

At a time t5 to t7, the transmission circuit 4 simultaneously outputs driving signals to the plurality of transmission lines TL1 to TL3. The reception circuit 6 selects the reception line RL3 and receives a detection signal in the reception line RL3.

In this embodiment as well, the contact position between the object and the touch panel 5 can be specified based on time change of each of the plurality of detection signals. That is, the waveform change of the detection signal becomes larger as the transmission distance of the ultrasonic wave from the vibration element 51 that generates the ultrasonic wave to the detection element 52 that detects the ultrasonic wave becomes shorter. The touch controller 3 can specify the contact position of the object by determining the detection signal at which the waveform change is maximum. In particular, in this embodiment, since the detection signal includes the plurality of frequency components corresponding to the plurality of transmission lines (or the plurality of driving signals), it is easy to determine which transmission line the changed frequency component in the detection signal corresponds to. Therefore, it becomes possible to specify the contact position in a short time.

In this embodiment, the method for determining the contact position of the object is not limited to the method for determining the detection signal at which the change in the detection signal is maximum. For example, the contact position of the object can be specified based on the frequency change of the signal component included in the detection signal. Hereinafter, a method for specifying the contact position is described with reference to FIG. 9.

Figures 9A, 9B:
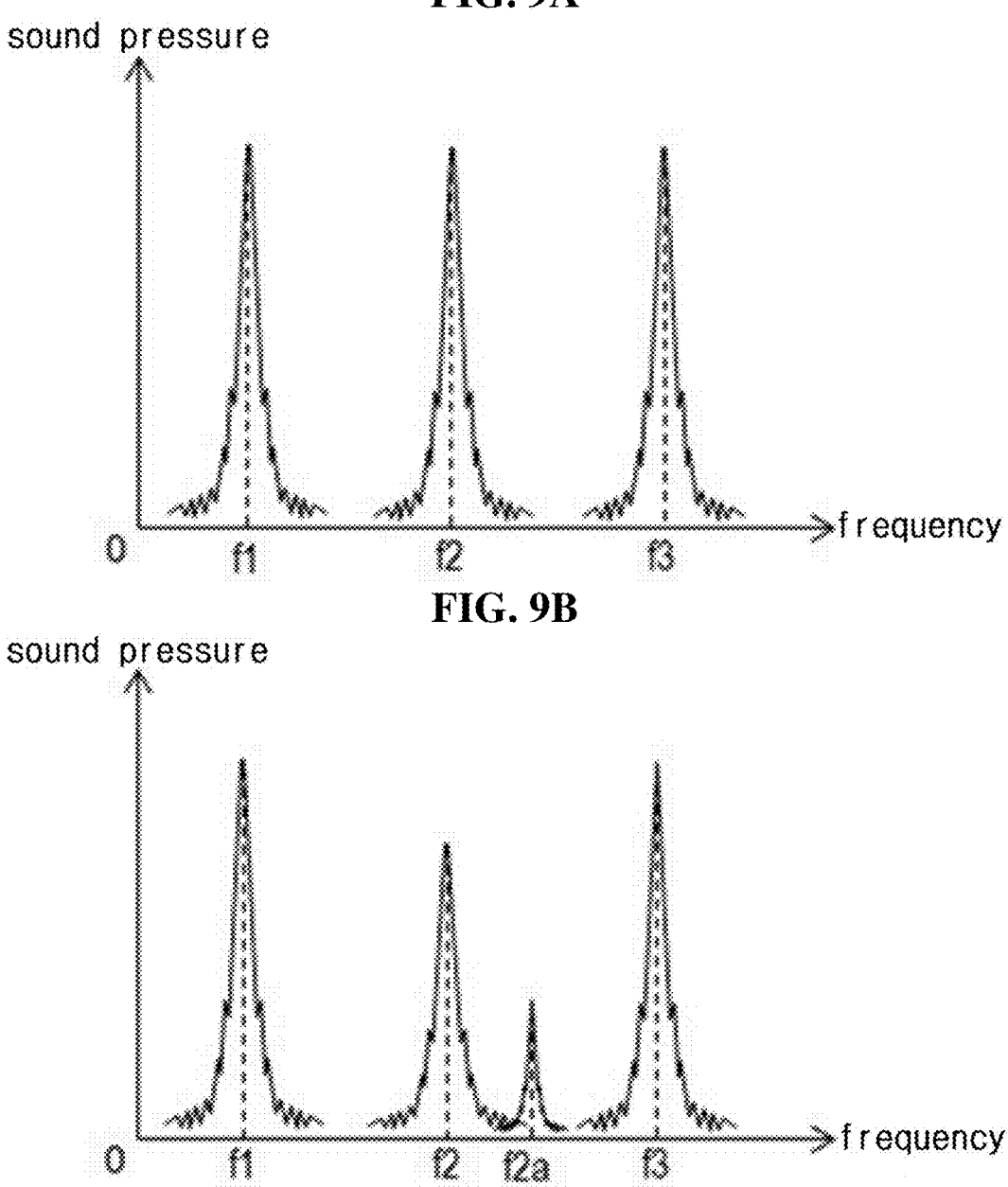
FIG. 9A and FIG. 9B illustrate detection signals in a display device according to a second embodiment of the present disclosure.

FIG. 9A and FIG. 9B illustrate detection signals in a display device according to one embodiment, and illustrate spectrums obtained by Fourier transform of the detection signals. In FIG. 9A and FIG. 9B, the horizontal axis represents frequency, and the vertical axis represents sound pressure.

FIG. 9A shows a spectrum when there is no contact between the object and the touch panel 5. As described above, the detection signal includes signal components of the frequencies f1, f2, and f3 of the driving signals. Therefore, the peak frequencies of the spectrum has the frequencies f1, f2, and f3. In addition, when the ultrasonic wave generated from the vibration element 51 is transmitted and reflected from the touch panel 5, the frequency of the ultrasonic wave may be shifted. Therefore, the peak frequencies of the spectrum may include a predetermined error with respect to the frequencies f1, f2, and f3 of the driving signals.

FIG. 9B shows a spectrum when there is contact between the object and the touch panel 5. When the object contacts the touch panel 5, the ultrasonic wave is reflected from the touch panel 5 and also reflected from the object. Due to the change in the transmission distance of the ultrasonic wave, the ultrasonic wave reflected from the object have a different frequency from the ultrasonic wave reflected from the touch panel 5. The sound pressure at the frequency f2 decreases, and a peak appears at a frequency f2a near the frequency f2. The touch controller 3 can detect the contact between the object and the touch panel 5 from the peak frequency of the spectrum of the detection signal.

The change in the spectrum peak frequency of the detection signal occurs not only at the frequency f2, but also at the frequency f1 and the frequency f3. In FIG. 9B, the change of the spectrum at the frequency f2 is greater than the change of the spectrum at the frequencies f1 and f3. Therefore, among the signal components of the detection signal, the signal component based on the ultrasonic wave generated from the vibration element 51 in the sensor element 50 connected to the transmission line TL2 changes the most. The touch controller 3 determines that the object is in contact at a position corresponding to the transmission line TL2 by determining the signal component of the detection signal at which the waveform change is the maximum. The touch controller 3 determines the detection signal at which the spectrum change at the frequency f2 is the maximum among the detection signals corresponding to the reception lines RL1 to RL3 to specify the contact position of the object.

In this embodiment as well, the touch controller 3 can specify the contact position of the object by comparing the detection signals corresponding to the reception lines RL1 to RL3.

In this embodiment as well, the plurality of sensor elements 50 share one reception line among the plurality of reception lines. In addition, the plurality of sensor elements 50 share one transmission line among the plurality of transmission lines. This makes it possible to simplify circuit configuration while also high-density mounting the sensor elements 50 to improve a resolution of touch detection. In addition, in this embodiment, the transmission circuit 4 transmits the plurality of driving signals having different frequencies to the plurality of transmission lines simultaneously. This makes it possible to shorten a time required to specify a contact position compared to the first embodiment in which the driving signals are sequentially transmitted to the plurality of transmission lines.

Third Embodiment

A display device in this embodiment is described. The display device in the third embodiment differs from the first embodiment in that it detects a touch and specifies a contact position by creating a learning model generated by a machine learning in advance. Hereinafter, description focuses on configuration different from the first embodiment.

Figures 10, 11:
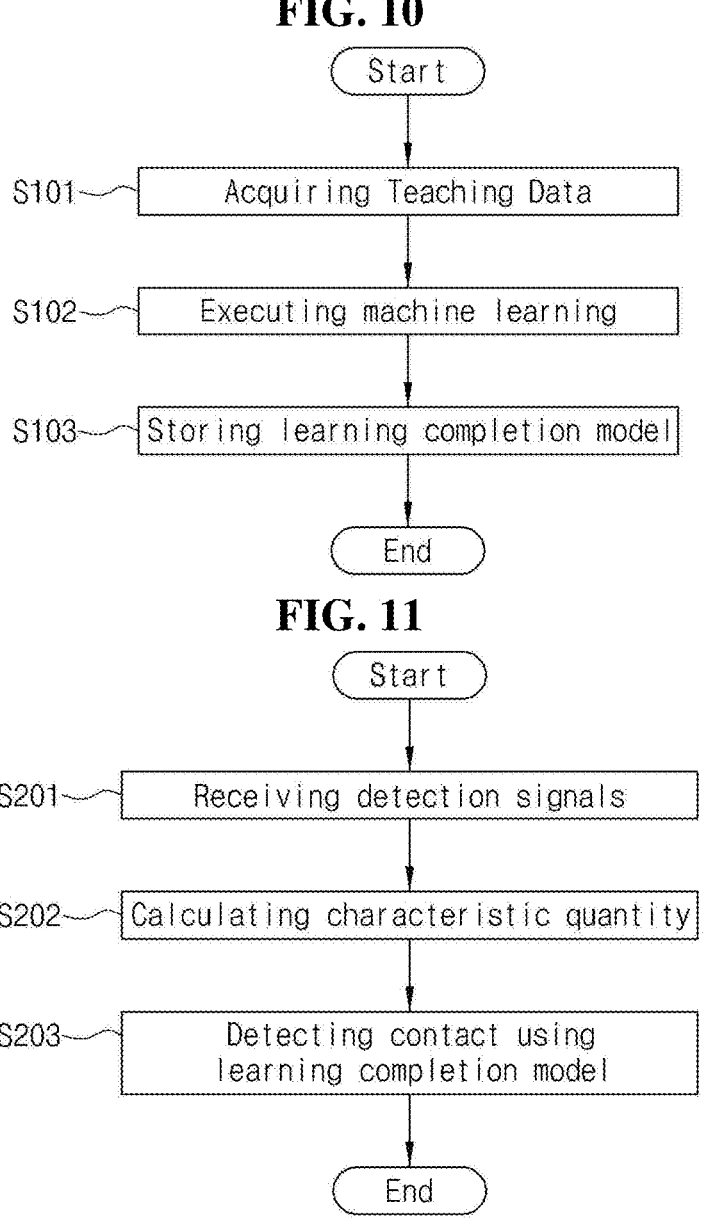
FIG. 10 is a flow chart of a display device according to a third embodiment of the present disclosure.
FIG. 11 is a flow chart of a display device according to a third embodiment of the present disclosure.

FIG. 10 is a flow chart of a display device according to the third embodiment, showing a generation process of a learning model. The machine learning in this embodiment is a Supervised Learning using Teaching Data, and detection signals acquired from the plurality of sensor elements 50 are used as Teaching Data. The touch controller 3 acquires Teaching Data (step S101). The touch controller 3 executes a machine learning based on the Teaching Data (step S102). The touch controller 3 generates a learning completion model by repeatedly executing the machine learning. The generated learning model is stored in a database of the display device (step S103).

FIG. 11 is a flow chart of a display device according to the one embodiment, showing a calculation process of producing a learning model.

First, the touch controller 3 receives detection signals from the plurality of sensor elements 50 (step S201). The touch controller 3 calculates characteristic quantity of the detection signal for each of the plurality of detection signals (step S202). The characteristic quantity of the detection signal may be time difference, voltage difference, time span, and/or peak frequency of spectrum of the detection signal. Subsequently, the touch controller 3 detects the contact between the object and the touch panel 5 from the characteristic quantity of the detection signal based on the learning completion model, and specifies the contact position between the object and the touch panel 5 (step S203).

As described above, according to the present embodiment, by using the learning model that relates the characteristic quantity of the detection signal and the contact of the object, it becomes possible to detect the contact between the object and the touch panel 5 and specify the contact position. The characteristic quantity of the detection signal changes depending on the ultrasonic wave transmission path from the vibration element 51 that generates the ultrasonic wave to the detection element 52 that detects the ultrasonic wave. Therefore, depending on the transmission path of the ultrasonic wave, it may be difficult to distinguish between the change in the characteristic quantity of the detection signal due to the contact of the object and the change in the detection signal due to the transmission of the ultrasonic wave. In the present embodiment, by using the learning model that relates the characteristic quantity of the detection signal and the contact of the object, it is possible to improve precision of the touch detection of the display device.

According to the present disclosure as above, it is possible to provide the touch sensor and the display device capable of improving a resolution of touch detection.

It will be apparent to those skilled in the art that various modifications and variation can be made in the present disclosure without departing from the spirit or scope of the invention. Thus, it is intended that the present invention cover the modifications and variations of this invention provided they come within the scope of the appended claims and their equivalents.

What is claimed is:

1. A touch sensor comprising:
a plurality of sensor elements that are arranged in a matrix shape across a first direction and a second direction that crosses the first direction, the plurality of sensor elements configured to transmit and receive ultrasonic waves; and
a plurality of lines connected to the plurality of sensor elements,
wherein at least one of the plurality of lines is shared by the plurality of sensor elements,
wherein each of the plurality of sensor elements includes a vibration element that includes a first dielectric and generates the ultrasonic wave according to a driving signal, and a detection element that includes a second dielectric, detects the ultrasonic wave and outputs a detection signal, and
wherein the first dielectric is separated from the second dielectric with a first insulating layer disposed between the first dielectric and the second dielectric.

2. The touch sensor of claim 1,
wherein the plurality of lines include a plurality of transmission lines that extend in the first direction and are connected to a plurality of vibration elements, and
wherein a transmission line from the plurality of transmission lines is shared by sensor elements from the plurality of sensor elements that are arranged in the first direction.

3. The touch sensor of claim 2,
wherein the plurality of lines includes a plurality of reception lines that extend in the second direction and are connected to a plurality of detection elements, and wherein a reception line from the plurality of reception lines is shared by sensor elements from the plurality of sensor elements that are arranged in the second direction.

4. The touch sensor of claim 3, further comprising:
a control unit that transmits the driving signal to the plurality of vibration elements through the plurality of transmission lines and receives the detection signal from the plurality of detection elements through the plurality of reception lines.

5. The touch sensor of claim 4, wherein the control unit sequentially transmits the driving signal having a same frequency to each of the plurality of transmission lines, and detects a touch based on the detection signal in each of the plurality of reception lines.

6. The touch sensor of claim 5, wherein the control unit detects a touch based on a change in the detection signal.

7. The touch sensor of claim 5, wherein the control unit detects a touch based on a time difference between a plurality of signal components included in the detection signal.

8. The touch sensor of claim 5, wherein the control unit detects a touch based on a voltage difference between peaks of a plurality of signal components included in the detection signal.

9. The touch sensor of claim 5, wherein the control unit detects a touch based on time spans of a plurality of signal components included in the detection signal.

10. The touch sensor of claim 5, wherein the control unit detects a touch based on a frequency change of a plurality of signal components included in the detection signal.

11. The touch sensor of claim 4, wherein the control unit simultaneously transmits a plurality of driving signals having different frequencies to the plurality of transmission lines, and detects a touch based on the detection signal in each of the plurality of reception lines.

12. The touch sensor of claim 10, wherein the control unit detects the touch based on changes in a plurality of frequency components included in the detection signal.

13. The touch sensor of claim 10, wherein the control unit detects the touch based on a peak value of a frequency spectrum of the detection signal.

14. The touch sensor of claim 12, wherein the control unit specifies a touch position based on a value of a detection signal having a maximum change among a plurality of detection signals.

15. The touch sensor of claim 12, wherein the control unit specifies a plurality of touch positions based on a change in each of a plurality of detection signals.

16. The touch sensor of claim 4, wherein the control unit includes a learning model that is input with data representing characteristic quantity of the detection signal and outputs data representing a touch position.

17. The touch sensor of claim 16, wherein the characteristic quantity includes at least one of a time difference between a plurality of signal components included in the detection signal, a voltage difference between peaks of the plurality of signal components, time spans of the plurality of signal components, and a frequency change of the plurality of signal components.

18. The touch sensor of claim 4, wherein the control unit further includes a selection unit configured to select a reception line connected to the control unit among the plurality of reception lines, and sequentially selects the reception line connected to the control unit.

19. The touch sensor of claim 1, wherein the vibration element includes a first electrode contacting a lower surface of the first dielectric, and a second electrode contacting an upper surface of the first dielectric, wherein the detection element includes a third electrode contacting a lower surface of the second dielectric, and a fourth electrode contacting an upper surface of the second dielectric, wherein a second insulating layer is below the first insulating layer and has a contact hole through which the first electrode contacts the lower surface of the first dielectric, and wherein the first insulating layer has a contact hole through which the fourth electrode contacts the upper surface of the second dielectric.

20. A display device comprising:

a touch panel including the touch sensor of claim 1; and a display panel facing the touch panel.

21. A touch sensor comprising:

M×N sensor elements each of which includes a vibration element that includes a first dielectric and generates an ultrasonic wave and a detection element that includes a second dielectric and detects the ultrasonic wave;

M transmission lines that extend in a first direction, each of the M transmission lines connected to N vibration elements; and N reception lines that extend in a second direction crossing the first direction, each of the N reception lines connected to M detection elements, wherein the first dielectric is separated from the second dielectric with a first insulating layer disposed between the first dielectric and the second dielectric.

22. The touch sensor of claim 21, further comprising:

a control unit that transmits a driving signal to the vibration element through a transmission line from the M transmission lines and receives a detection signal from the detection element through a reception line from the N reception lines.

23. The touch sensor of claim 22, wherein the control unit sequentially selects the M transmission lines, and transmits the driving signal of a same frequency to the selected transmission line, and wherein the control unit sequentially selects the N reception lines and receives the detection signal through the selected reception line.

24. The touch sensor of claim 22, wherein the control unit simultaneously transmits M driving signals of different frequencies to the M transmission lines, and wherein the control unit sequentially selects the N reception lines and receives the detection signal through the selected reception line.

25. A touch detection method, comprising:

generating ultrasonic waves from a plurality of sensor elements that are arranged in a matrix shape across a first direction and a second direction that crosses the first direction; and receiving the ultrasonic waves in the plurality of sensor elements, wherein the plurality of sensor elements are connected to a plurality of lines, wherein at least one of the plurality of lines is shared by the plurality of sensor elements, wherein each of the plurality of sensor elements includes a vibration element that includes a first dielectric and generates the ultrasonic wave according to a driving signal, and a detection element that includes a second dielectric, detects the ultrasonic wave and outputs a detection signal, and wherein the first dielectric is separated from the second dielectric with a first insulating layer disposed between the first dielectric and the second dielectric.

26. The touch sensor of claim 21, wherein the vibration element includes a first electrode contacting a lower surface of the first dielectric, and a second electrode contacting an upper surface of the first dielectric, wherein the detection element includes a third electrode contacting a lower surface of the second dielectric, and a fourth electrode contacting an upper surface of the second dielectric, wherein a second insulating layer is below the first insulating layer and has a contact hole through which the first electrode contacts the lower surface of the first dielectric, and wherein the first insulating layer has a contact hole through which the fourth electrode contacts the upper surface of the second dielectric.

27. A display device comprising:

a touch panel including the touch sensor of claim 21; and a display panel facing the touch panel.

* * * * *